US012234940B2

(12) United States Patent
Dong et al.

(10) Patent No.: US 12,234,940 B2
(45) Date of Patent: Feb. 25, 2025

(54) IN-SITU DETECTION ROBOT FOR LOESS GEOLOGICAL INFORMATION

(71) Applicant: CHANG'AN UNIVERSITY, Shaanxi (CN)

(72) Inventors: Zhonghong Dong, Xi'an (CN); Haoyi Yang, Xi'an (CN); Shixuan Ren, Xi'an (CN); Sensen Liu, Xi'an (CN); Xiaoming Liu, Xi'an (CN); Hengxing Lan, Xi'an (CN); Changgen Yan, Xi'an (CN); Han Bao, Xi'an (CN); Jiangbo Xu, Xi'an (CN); Xin Liu, Xi'an (CN)

(73) Assignee: CHANG'AN UNIVERSITY, Xi'an (CN)

(*) Notice: Subject to any disclaimer, the term of this patent is extended or adjusted under 35 U.S.C. 154(b) by 591 days.

(21) Appl. No.: 17/671,474

(22) Filed: Feb. 14, 2022

(65) Prior Publication Data

US 2022/0171403 A1 Jun. 2, 2022

Related U.S. Application Data

(63) Continuation of application No. PCT/CN2020/113449, filed on Sep. 4, 2020.

(30) Foreign Application Priority Data

Nov. 22, 2019 (CN) .......................... 201911153811.4

(51) Int. Cl.
*F16L 55/28* (2006.01)
*F16L 55/32* (2006.01)
(Continued)

(52) U.S. Cl.
CPC .................................. *F16L 55/28* (2013.01)

(58) Field of Classification Search
CPC ........ G01N 3/02; G01N 19/00; G01N 29/265; G01N 1/08; B25J 13/085; B25J 5/00;
(Continued)

(56) References Cited

U.S. PATENT DOCUMENTS

| 6,427,602 B1 * | 8/2002 | Hovis | F16L 55/34 |
| | | | 104/138.1 |
| 2016/0176452 A1 * | 6/2016 | Gettings | B62D 55/0655 |
| | | | 180/9.42 |

FOREIGN PATENT DOCUMENTS

| CN | 103737589 A | 4/2014 |
| CN | 108488539 A | 9/2018 |

(Continued)

OTHER PUBLICATIONS

International Search Report (PCT/CN2020/113449); Date of Mailing: Nov. 25, 2020.

*Primary Examiner* — Brandi N Hopkins
(74) *Attorney, Agent, or Firm* — W&G Law Group

(57) ABSTRACT

Disclosed is an in-situ detection robot for loess geological information, including a housing, an active tensioning system, an auxiliary tensioning system, a control system, a drive system, and a detection system. The active tensioning system is configured to provide the robot with a tensioning force in an aperture direction of a loess hole for the robot to travel in the loess hole. The auxiliary tensioning system is configured to provide the robot with a pre-tensioning force for the robot to travel in the loess hole. The control system is configured to control a movement mode of the robot according to different travelling environments of the robot in the loess hole. The driving system is configured to provide the robot with a travelling power in the loess hole. The detection system is configured to detect related parameters of the loess geological information. The robot according to the present disclosure has a simple structure, can adapt to an (Continued)

aperture change of 100-150 mm, can effectively solve the problem in which the crawler pipe robot has a large radial size, has strong obstacle crossing ability and trafficability performance, and is applicable to the detection of geological information in the loess hole, which fills the existing technical gap.

9 Claims, 5 Drawing Sheets

(51) Int. Cl.
  *G01D 21/02* (2006.01)
  *G05D 1/00* (2024.01)
(58) Field of Classification Search
  CPC ......... B25J 5/005; B25J 9/1635; F16H 55/14; B08B 9/0409; E21B 7/02; E21B 25/16; E21B 3/02; E21B 49/00; E21B 17/22; B64G 1/66; F16L 55/134; F16L 55/32; F16L 55/26; F16L 55/28; F16L 55/40; F16M 11/425; B62D 55/065; B62D 57/02; Y02E 10/50; G01S 13/885; G01V 3/12; B60F 5/02
  See application file for complete search history.

(56) References Cited

FOREIGN PATENT DOCUMENTS

| | | | |
|---|---|---|---|
| CN | 108612957 | A | 10/2018 |
| CN | 109945918 | A * | 6/2019 |
| CN | 110159869 | A | 8/2019 |
| CN | 110864735 | A | 3/2020 |
| JP | H0939859 | A | 2/1997 |

* cited by examiner

IN-SITU DETECTION ROBOT FOR LOESS GEOLOGICAL INFORMATION

TECHNICAL FIELD

The present disclosure relates to loess geological information detection, and in particular, to an in-situ detection robot for loess geological information.

BACKGROUND

A loess itself is a special kind of disaster-prone soil. It has strong catastrophic sensitivity, which is mainly manifested by extremely strong water sensitivity, fragile structure, unique strength attenuation, complex degradation process, and dynamic disturbances sensitivity and the like. Therefore, this kind of soil is prone to a series of engineering disasters, such as road subsidence, housing tilt, and dam cracks on the Loess Plateau. Therefore, it is particularly important for the detection of loess geological information and soil mechanical properties. Currently, the existing detection method is mainly performed by testing with professional instruments based on manual soil sampling, which is also referred as laboratory test. The sample needs to be collected in the filed for the laboratory test, such test method destroys the original structure of the soil, and it is difficult to guarantee reliability and accuracy of the test parameters. Compared with the laboratory test, an in-situ detection test can be performed without destroying the original structure of the soil, and can obtain more reliable experimental data.

Currently, the mainstream pipeline robots at home and abroad mainly include wheel type and track type. However, compared with ordinary pipelines, loess holes often have defects such as cavities, bulges, and local collapsibility. In addition, the wheel type pipeline detection robot has poor obstacle-crossing ability and trafficability performance, it is not suitable for loess holes. For such holes, track-type pipeline robots with stronger obstacle-crossing ability and trafficability performance should be selected. Taking into account the damage to the original soil and other factors, in order to reduce the disturbance to the soil, the loess hole drilled by the existing loess drilling device generally has a diameter of 100-150 mm, which is relatively smaller than other pipelines. Therefore, it is difficult to apply the current track-type hole robot to such small hole detection due to its larger radial size.

SUMMARY

In view of the above defects in the related art, an object of the present disclosure is to provide an in-situ detection robot for loess geological information, which is intended to solve the problem in which the existing track-type pipeline robot has too large size to detect related parameters at any designated position in a loess hole and transmit three-dimensional geological information of the loess hole in the related art, to fill the existing technical gaps.

According to at least one embodiment of the present disclosure, there is provided an in-situ detection robot for loess geological information, including: a housing including a first housing member and a second housing member connected to the first housing member, each of the first housing member and the second housing member provided with a track; and a tensioning system configured to provide the robot with a tensioning force in an aperture direction of a loess hole for the robot to travel in the loess hole, and including an active tensioning system; the active tensioning system includes a tensioning motor (electric engine), a driving camshaft, a driving cam group, at least one driven cam group and at least one connection base frame; the tensioning motor is located inside the housing and connected to the driving camshaft, the tensioning motor configured to provide a driving force for the active tensioning system; the driving camshaft is configured to support the driving cam group and transmit a driving force from the tensioning motor; the driving cam group is configured to transmit the driving force from the driving camshaft to the at least one driven cam group; the at least one driven cam group is configured to convert the driving force from the driving cam group into the tensioning force of the track in the aperture direction of the loess hole; and the at least one connection base frame is configured to support the track while providing vibration damping and resetting.

Further, the tensioning motor is fixed inside the second housing member, and is connected to the driving camshaft via a coupling. The driving camshaft is supported by two connection bearings fixed inside the first housing member and the second housing member at both ends thereof, respectively. The driving cam group includes six driving cams which are axially positioned in a form of axial shoulder fixation and are circumferentially positioned by a key so that each of the driving cams is operated accurately. The at least one connection base frame comprises three connection base frames spaced apart from each other by 120 degrees in a circumferential direction and supports the track in a form of a simple supporting beam. Each of the three connection base frames includes a first end slider, a second slider and an intermediate connection shaft, the first slider is fixed to the first housing member by a sliding groove guide rail, and an elastic body is disposed between an end surface of the first slider and an upper end surface of a groove of the first housing member. The second slider is connected in the same way as the first slider, and is configured to circumferentially fix the simple supporting structure, configured to move in a groove where the first slider or the second slider is located, and providing vibration damping and resetting for the first slider or the second slider by the elastic body. The intermediate connection shaft is configured to fix the first slider or the second slider to support the at least one driven cam group including three driven cam groups, any one of the driven can groups includes two driven cams, and the three driven cam groups are spaced apart from each other by 120 degrees in the circumferential direction, and each of the three driven cam groups is fixed on the intermediate connection shaft.

In addition, the robot further includes an auxiliary tensioning system configured to provide the robot with a pre-tensioning force for travelling in the loess hole and to measure a travelling distance of the robot in the loess hole at the same time.

Further, the auxiliary tensioning system includes an elastic sleeve, a connection body connected to the elastic sleeve and an odometer wheel. The auxiliary tensioning system includes six elastic sleeves, each of the first housing member and the second housing member respectively includes three elastic sleeves spaced apart from each other by 120 degrees in the circumferential direction, and the elastic sleeves are configured to provide the robot with the pre-tensioning force for travelling in the loess holes. The odometer wheel is fixed to the elastic sleeves by the connection body and is configured to transmit the pre-tensioning force from the elastic sleeves and measure the travelling distance of robot in the loess hole.

In particular, the robot further includes: a control system configured to control the movement mode of the robot based on different travelling environments of the robot in loess holes; and a drive system configured to provide the robot with a power for travelling in the loess holes.

Further, the control system includes a control circuit board located on an inner wall of the second housing member, the control circuit configured to receive information outputted by the detection system, process the information outputted by the detection system, and transmit collected loess geological information to a ground data collecting center through a communication module mounted on the control circuit board, and further configured to output an electric signal for controlling the motor based on received obstacle information and pressure information to be received.

Further, the drive system includes three single-side tracks spaced apart from each other by 120 degrees in the circumferential direction, each of the single-side track including a driving motor, a bevel gear, a spur gear, a track side plate, a drive pulley, a driven pulley, an elastic track, and a plurality of drive system bearings. The driving motor is connected on the track side plate to provide the single-side track with a driving force for travelling. The bevel gear is fixed on an output shaft of the driving motor and configured to transmit a power from the driving motor to a transmission shaft, and then engaged with the spur gear on a shaft where the driving pulley is located by the spur gear on the transmission shaft, such that the driving pulley obtains torque and rotating speed to drive the single-side track to rotate. The transmission shaft is supported by a drive system bearing fixed by a bearing end cover fixed on the track side plate.

Moreover, the robot further includes a detection system for detecting parameters associated with the loess geological information.

Further, the detection system includes: an optical moisture content detector configured to detect moisture content of a soil at any specified position in the loess hole; an ultrasonic sensor configured to detect a distance between the robot and an obstacle in front of the robot in the loess hole; a camera configured to construct three-dimensional geological information in the loess hole and identify interface information of a loess and an ancient soil; a γ-spectrum density measuring instrument configured to detect a density of the soil at the specified position in the loess hole; a pressure sensor configured to monitor a pressure between the track and an inner wall of the loess hole; a spiral displacement sensor configured to record deformation of the soil at any moment when the robot travels in the loess hole; a membrane pressure sensor configured to record a pressure encountered by the soil at any moment; and a data collecting center configured to analyzes soil modulus information based on output parameters output by the optical moisture content detector, the ultrasonic sensor, the camera, the γ-spectrum density measuring instrument, the pressure sensor, the spiral displacement sensor, and the membrane pressure sensor.

The present disclosure has the following beneficial effects over the related art.

The robot according to the present disclosure has a simple structure, and can adapt to aperture change of 100-150 mm by the tensioning system, and can effectively solve the problem in which the track-type pipeline robot has too large size due to the large space occupied by the traditional tensioning device. Therefore, the track pipeline robot with strong obstacle crossing ability and trafficability performance is applicable to the detection of geological information in the loess hole, which fills the existing technical gap.

In the present disclosure, the robot is equipped with various detection instruments to collect the soil density, the moisture content, the modulus and other parameters in the loess pores and identify the three-dimensional soil geological information at the same time. Furthermore, a spherical joint is disposed at one end of the right housing to connect the robot with other detection instruments in the loess hole by a spherical joint connection so as to cooperate with the other instruments to perform related testing and detection. That is, the robot can be used as a multifunctional experimental platform, on which a variety of professional testing instruments may be carried to perform the comprehensive detection of the parameters in the loess hole.

REFERENCE LIST

Figure 1:
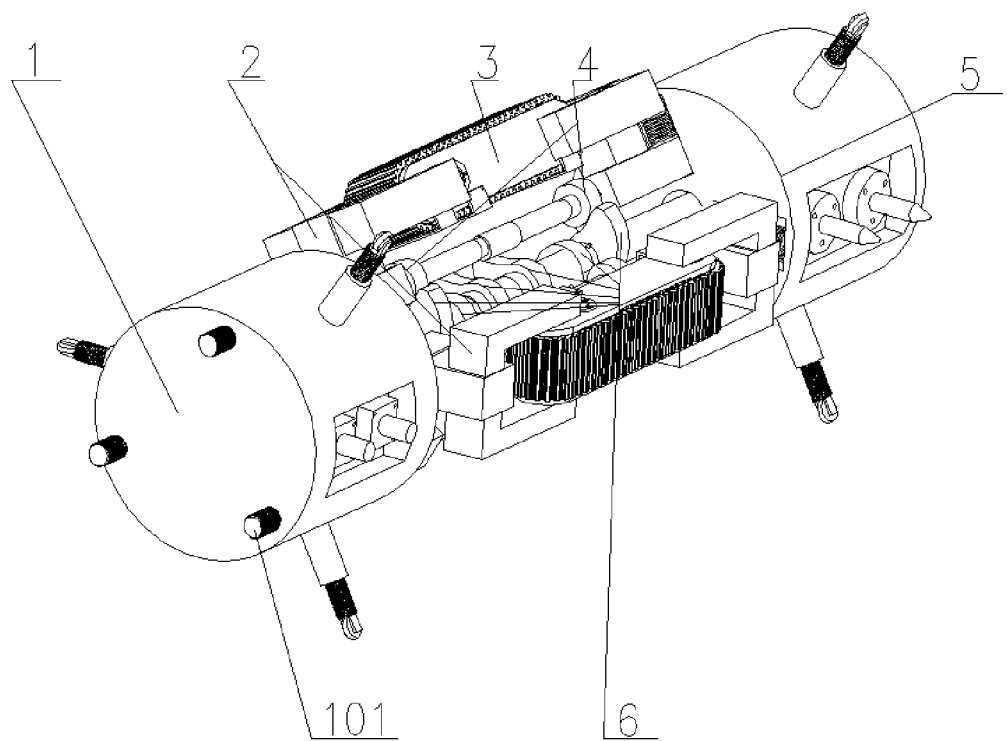
FIG. 1 is a isometric view of an in-situ detection robot for loess geological information according to an embodiment of the present disclosure.
Figure 2:
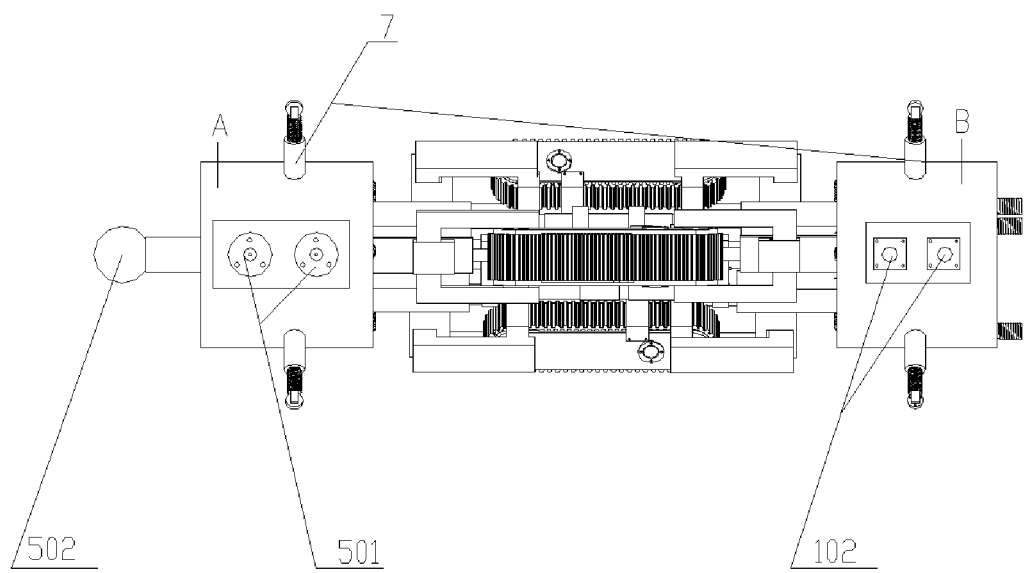
FIG. 2 is a front view of the in-situ detection robot for loess geological information shown in FIG. 1.
Figure 3:
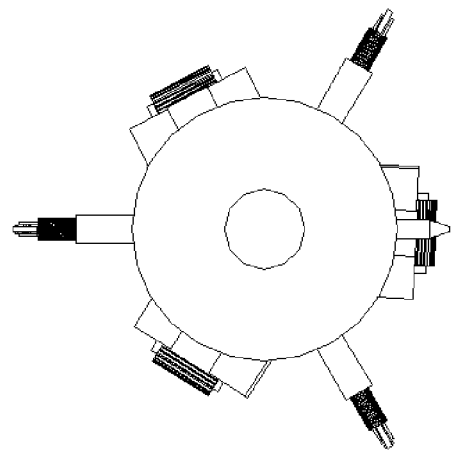
FIG. 3 is a left view of the in-situ detection robot for loess geological information shown in FIG. 1.

1: first housing member
2: connection base frame
3: single-side track
4: driven cam
5: second housing member
6: driving cam;
7: auxiliary support body
8: driving camshaft
9: key
10: robot
11: connection bearing
12: tension motor
13: sliding groove guide rail
101: ultrasonic sensor
102: γ-spectrum density measuring instrument
103: camera
104: bearing
201: second slider
202: intermediate connection shaft 203: first slider
301: track side plate
302: bearing end cover
303: driving pulley
304: drive system bearing
305: driving motor
306: bevel gear
307: driven pulley
308: spur gear I
309: spur gear II
501: optical moisture content detector
502: spherical joint
503: elastomer
504: motor support
505: control circuit board
506: pressure sensor
701: film pressure sensor
702: odometer wheel
703: helical displacement sensor
704: elastic sleeve

DESCRIPTION OF EMBODIMENTS

Embodiments of the present disclosure will be described in detail hereinafter with reference to the accompanying drawings in order to better understand technical solutions of the present disclosure by those skilled in the art. It should be understood that the embodiments described are merely some of, rather than all of the embodiments of the present disclosure, and is not intended to limit the scope thereof. In addition, in the following description, the descriptions of well-known structures and technologies are omitted to avoid unnecessary confusion of the concepts disclosed in the present disclosure. Based on the embodiments as described in the present disclosure, all other embodiments made by those of ordinary skilled in the art without inventive step shall fall within the scope of the present disclosure.

The accompanying drawings show various structural schematic views according to the embodiments of the present disclosure. These figures are not drawn to scale, and some details are enlarged and some details may be omitted for clarity of presentation. Shapes of the various regions and layers shown in the drawings and the relative size and positional relationship therebetween are merely exemplary. In practice, there are deviations on the shapes, the relative size and the positional relationship due to manufacturing tolerances or technical limitations. The regions/layers with different shapes, sizes, and relative positions may be designed as needed by those skilled in the art.

In the context of the present disclosure, when a layer/element is described as being located "on" another layer/element, the layer/element may be directly on the another layer/element, or there may be an intermediate layer/element therebetween. In addition, if a layer/element is located "above" another layer/element in one orientation, the layer/element may be located "below" the other layer/element when the orientation is reversed.

It should be noted that the terms "first" and "second" in the description and claims of the present disclosure and the above drawings are used to distinguish similar objects, and is not intended to describe a specific sequence or order. It should be understood that the data used in this way may be interchanged under appropriate circumstances so that the embodiments described herein can be implemented in a sequence other than those illustrated or described herein. In addition, the terms "including" and "having" and any variations thereof are intended to cover non-exclusive inclusions. For example, processes, methods, systems, products, or devices that include a series of steps or units are intended to include other steps or units that are not clearly listed or are inherent to these processes, methods, products, or devices, rather than being limited to those clearly listed.

The present disclosure will be described in further detail below with reference to the accompanying drawings:

The loess geological information described herein refers to a moisture content, a soil density, a modulus, a three-dimensional geological information in a loess hole and the like.

Embodiment 1

Referring to FIGS. 1 to 10, Embodiment 1 provides an in-situ detection robot for loess geological information including: a robot housing including a left housing, an driving camshaft and a right housing; a detection system including an optical moisture content detector 501, an ultrasonic sensor 101, a high-definition camera 103, a γ-spectrum density measuring instrument 102, a spiral displacement sensor 703, a odometer wheel 702, and a membrane pressure sensor 701, the detection system configured to detect related parameters of the loess geological information; a tensioning system including an active tensioning mechanism and an auxiliary tensioning mechanism, which active tensioning mechanism includes a tensioning motor 12, a driving camshaft 8, a driving cam 6, a driven cam 4, and a connection base frame 2, and the auxiliary tensioning mechanism includes an elastic sleeve 704, a connection body connected to the elastic sleeve, and a odometer wheel 702, and the tensioning system is configured to provide a robot with a pressure, also referred as a tensioning force, in an aperture direction for traveling in a loess hole; a drive system (single side) including a track side plate 301, a driving motor 305, a bevel gear 306 and a gear 308, a gear 309, a driving pulley 303, a driven pulley 307, a bearing 302, and a rubber track, and the drive system is configured to provide the robot with a power for travelling in the loess hole; and a control system including a tension motor 12, three driving motors 305, various detection elements and a control circuit board 505, which control system is configured to control the movement mode of the robot based on different travelling environments encountered by the robot.

Specifically, the robot housing mainly includes a left housing 1, a driving camshaft 8 and a right housing 5. Both the left housing 1 and the right housing 5 are revolving bodies with grooves therein, and the driving camshaft 8 are supported by two bearings fixed to the left housing 1 and the right housing 5 at both ends thereof, respectively.

Specifically, the detection system fixes the optical moisture content detector 501 into the groove of the right housing 5 to detect a moisture content of a soil at a specified position in the loess hole, and to transmit the detected data to the control circuit board 505 to be transmitted to a ground data collecting center via a wired communication. Three ultrasonic sensors 101 are fixed on an end surface of the left housing of the robot through a threaded connection in order to detect a distance between the robot and an obstacle in front thereof. Further, the ultrasonic sensors are configured to transmit distance information between the robot 10 and the obstacle in front thereof to the control circuit board 505. The high-definition camera 103 is fixed into the groove of the left housing 1 of the robot through the threaded connection to construct three-dimensional geological information of the loess hole. The ground data collecting center perform an identification of interface information such as loess and paleosol through a machine vision processing based on the transmitted three-dimensional geological information. The γ-spectrum density measuring instrument 102 is fixed into the groove of the left housing 1 through the threaded connection to measure a density of the soil at the specified position in the loess hole. The pressure sensor 506 is fixed on an upper end surface of a right slider 201 to monitor a pressure between a robot track and an inner wall of the loess hole. The spiral displacement sensor 703 is disposed between the elastic sleeve 704 and the odometer wheel 702, and the odometer sensor is fixed on the odometer wheel 702 through a precision welding. The membrane pressure sensor 701 is fixed between the odometer wheel and a shaft on which the odometer wheel is positioned. The odometer wheel is configured to record a travelling distance that the robot travels in the loess hole, the spiral displacement sensor 703 is configured to record deformation of the soil at any time when the robot is travelling in the loess hole, and the membrane pressure sensor 701 is configured to record a pressure applied to the soil at any time. Further, the ground data collecting center can analyze modulus information of the soil based on the parameters output by the sensors as described.

At the same time, in order to allow the robot to travel in the hole normally, a predetermined pressure is required to be applied to the robot in the aperture direction of the loess hole. Therefore, the robot is equipped with a tensioning system.

Specifically, the tensioning system includes an active tensioning mechanism and an auxiliary tensioning mechanism. The active tensioning mechanism includes a tensioning motor, a driving camshaft, a driving cam group, a driven cam group and a connection base frame. The tensioning motor 12 is fixed on a motor support 504 which is fixed inside the right housing 5 through the threaded connection. The motor 12 is connected to the driving camshaft 8 to provide a driving force for the tensioning system. The driving camshaft 8 are respectively supported by two bearings at both ends of the driving camshaft 8, and the two bearing are fixed inside the left housing and the right housing, respectively. Further, the driving camshaft 8 is configured to support the driving cam and transmit a power from the tensioning motor. The driving cam group includes 6 driving cams which are positioned axially in a form of axial shoulder fixation and positioned circumferentially through a flat key 9, so as to ensure that each driving cam 6 can be operated accurately at its respective operating positions to transmit the power from the driving camshaft to the driven cam group. The active tensioning mechanism includes three connection base frames which are spaced apart from each other by 120 degrees in a circumferential direction. The single-side connection base frame includes a left end slider 203, a right end slider 201 and an intermediate connection shaft 202, and is configured to support a single-side track 3 by a simply supported beam. The left end slider 203 is fixed to the left housing by a sliding groove guide rail 13, and a spring 503 is arranged between an end surface of the slider and an upper end surface of the groove of the housing. The right end slider is fixed to the right housing in the same way as the right end slider, and is configured to fix a simple supporting structure in the circumferential direction, and to be allowed to move along the groove where each slider is located. Further, the spring can provide damping and resetting to the right end slider. The intermediate connection shaft 202 fixes the two sliders together by welding, and is configured to connect the left and right sliders and support the driven cam group. The active tensioning mechanism includes three driven cam groups 4 which are spaced apart from each other by 120 degrees in the circumferential direction. Each of the cam groups is fixed on the intermediate connection shaft 202 of the single-side connection base frame in a similar way as the active cam group. Further, the driven cam groups are configured to transmit the power from the active cam group, and convert the power into displacement along the chute direction, so that the pressure can be applied to the track 3 in the aperture direction of loess hole.

More specifically, the auxiliary tensioning system mainly includes an auxiliary support body 7 which consists of an elastic sleeve 704, a connection body connected to the elastic sleeve 704, and an odometer wheel 702. There are six elastic sleeves which are spaced apart from each other by 120 degrees in the circumferential direction. Further, three of the six elastic sleeves are arranged on the left housing, and three of the six elastic sleeves are arranged on the right housing. In addition, the single elastic sleeve 704 is fixed to the housing at one side by welding to provide the robot 10 with a predetermined pretension force for travelling in the loess hole. The odometer wheel 702 is fixed together with the elastic sleeve 704 by the connection body to transmit the pretension force from the elastic sleeve and measure the travelling distance of the robot in the loess hole.

Specifically, the drive system includes three single-side tracks 3 spaced apart from each other by 120 degree in the circumferential direction, and two side plates 301 of the single-side track 3 are fixed to the connection base frame 2 through the threaded connection.

More specifically, the single-side track 3 includes two track side plates 301, a driving motor 305, a pair of bevel gears 306 and a pair of spur gears 308, 309, a driving pulley 303, a driven pulley 307, 4 bearings 304 and a rubber track. The driving motor 305 is fixed on the track side plate 301 through the threaded connection to provide a driving force for a track travelling mechanism. One bevel gear is fixed on an output shaft of the motor and is engaged with the bevel gear 306 on a transmission shaft to transmit a power from the driving motor 501 to the transmission shaft. The spur gear 309 on the transmission shaft is engaged with the spur gear 308 on the shaft where the driving pulley 303 is located, so that a certain torque and speed is provided to the driving pulley 303 to drive the track to rotate. Further, the drive shaft and a pulley shaft are supported by the bearings 304 at both ends thereof, and the bearings 304 at both ends are fixed by bearing end covers fixed on the two side plates 301.

Figure 6:
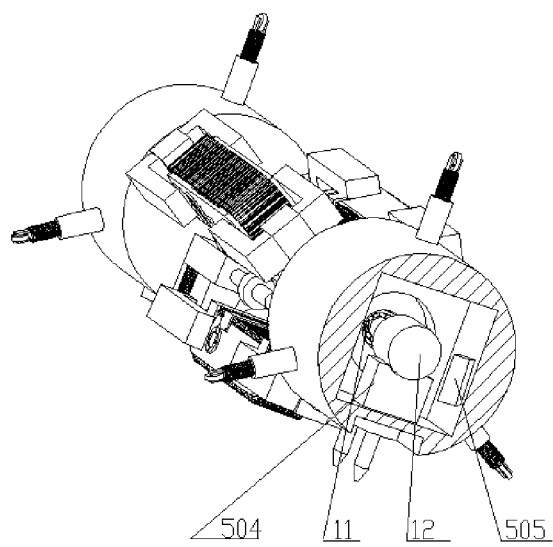
FIG. 6 is a sectional view of a part B of the in-situ detection robot for loess geological information shown in FIG. 2.
Figure 7:
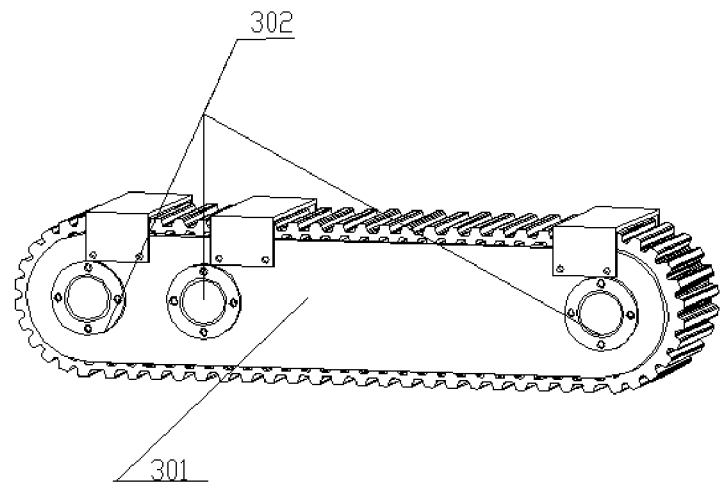
FIG. 7 is a schematic view of an overall structure of a track portion according to an embodiment of the present disclosure.
Figure 8:
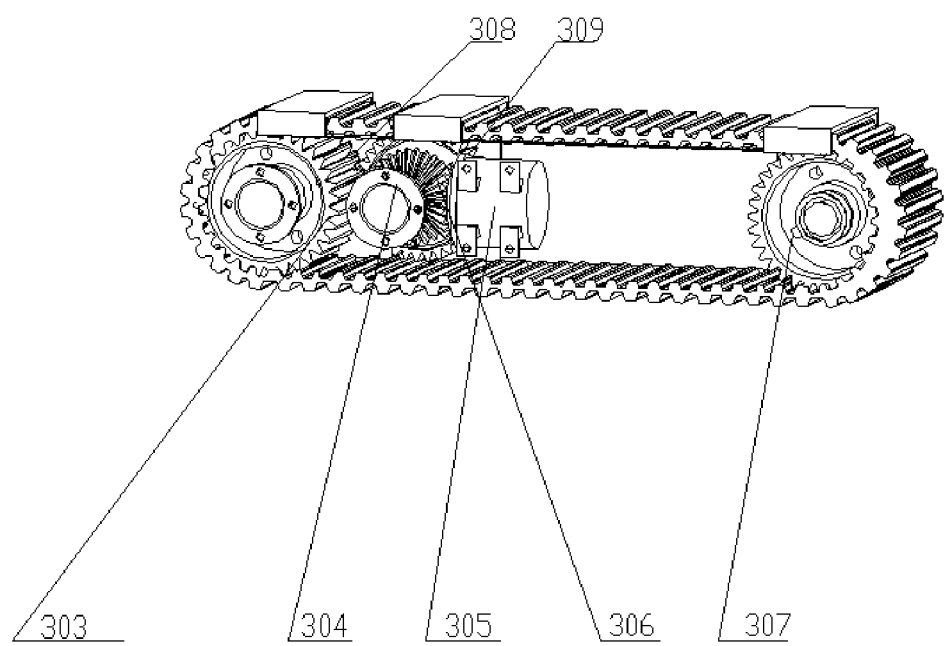
FIG. 8 is a schematic view of an internal structure of the track portion according to an embodiment of the present disclosure.
Figure 9:
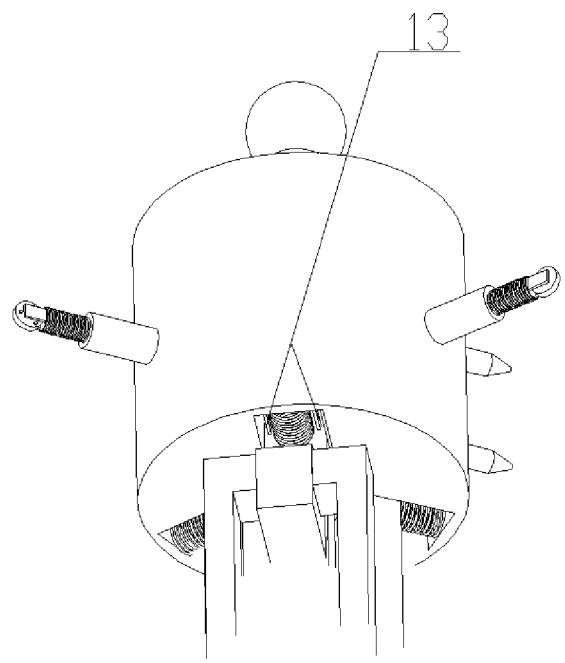
FIG. 9 is a partial schematic view of an in-situ detection robot for loess geological information according to an embodiment of the present disclosure.
Figure 10:
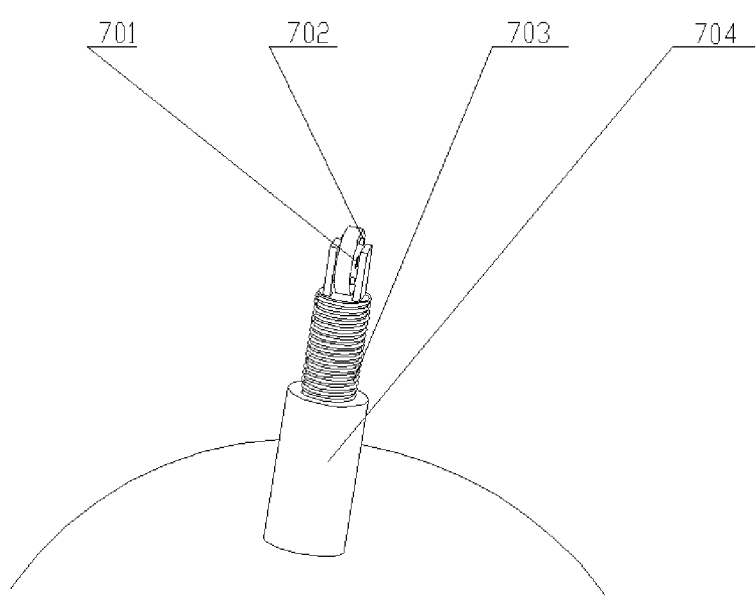
FIG. 10 is a schematic view of the structure of an auxiliary support portion of the in-situ detection robot for loess geological information according to an embodiment of the present disclosure.

Specifically, the control system mainly includes a control circuit board 505, various elements of the detection system, three driving motors 305 and a tensioning motor 12. The control circuit board 305 is the core component of the control system. As shown in FIG. 6, the control circuit board 305 is fixed on an inner wall of the right housing through the threaded connection. Further, the control circuit board 305 is configured to (1) receive information transmitted by the various elements of the detection system; (2) process and calculate the data information transmitted by the detection system and transmit the moisture content, the soil density, the modulus, and the three-dimensional geological information of the loess hole to the ground data collecting center via the communication module; and (3) output electrical signals for controlling the tensioning motor and the driving motor based on obstacle information and pressure information between the track and the loess hole sent by the ultrasonic sensor 101 and the pressure sensor 506.

Preferably, a spherical hinge joint is provided at an end of the right housing, so that the robot can be connected to other detection instruments in the loess hole by the spherical hinge joint to cooperate with the other detection instruments to perform related tests and detections. That is, the robot may be used as a multifunctional experimental platform, on which a variety of professional detection instruments can be connected and carried to realize a refined detection of the parameters in the loess hole.

An operation process of the in-situ detection robot for loess geological information as described above will be described below.

Firstly, after drilling a loess hole in an experimental area, the robot 10 enters run into the loess hole by releasing a cable.

Further, the auxiliary tensioning mechanism of the tensioning system is initially operated. The robot 10 is fixed in the loess hole by the support of the pre-tensioning force of the elastic sleeves 704 disposed at both sides of the housing. Further, three auxiliary support structures spaced apart from each other by 120 degrees in the circumferential direction are employed with high centering accuracy, such that an axis of the robot 10 is substantially coincident with that of the loess hole.

Figure 4:
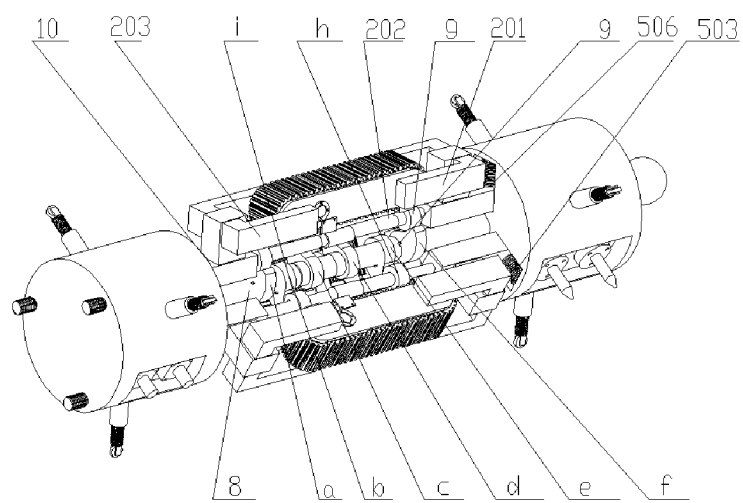
FIG. 4 is a structural view of a preferred embodiment of an in-situ detection robot for loess geological information according to an embodiment of the present disclosure.
Figure 5:
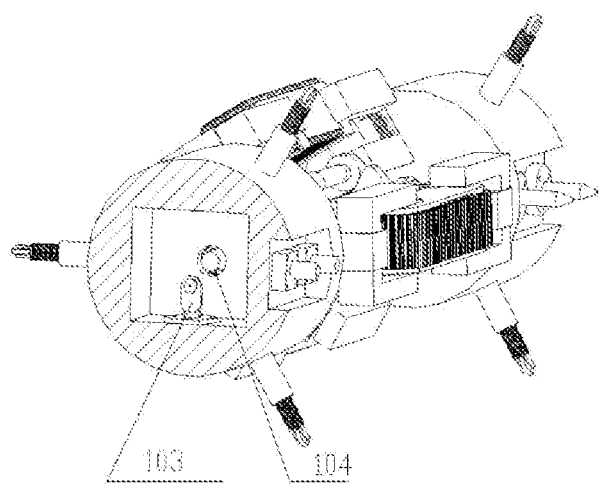
FIG. 5 is a sectional view of a part A of the in-situ detection robot for loess geological information shown in FIG. 2.

Further, the left housing 1 and the right housing 5 of the robot 10 are used as a base, and the active tensioning mechanism is initially operated, as shown in FIG. 4. Firstly, the tensioning motor 12 starts to rotate to drive the driving camshaft 8 to rotate through a coupling. The key 9 transmits a rotating power from the driving camshaft 8 to driving cams a-f. At this time, each of the driving cams a-f obtains a certain speed and torque. Thereafter, the rotations of the driving cams a and f are converted into linear movements in the groove direction by a cam transmission, so that the connection base frame 2 and the single-side track 3 can move a predetermined distance in the groove direction. At this time, the single-side track 3 is brought into contact with the inner wall of the loess hole and is exerted with a predetermined contact pressure. At the same time, the driving cams b and e rotate to move the driven cams h and i linearly together with the connection base frame 2 in the groove direction through the cam transmission, so that the second side track is also brought into contact with the inner wall of the loess hole and is exerted with a predetermined contact pressure. Similarly, the third side track is driven by the driving cams c and d to be brought into contact with the inner wall of the loess hole.

Further, the pressure sensor 506 transmits data signal of the pressure between the track and inner wall of the loess hole to the control circuit board 505. The control circuit board 505 determines whether the pressure is sufficient. If the pressure is insufficient, the control circuit board 505 sends a signal to control the tensioning motor 12 to further rotate.

Furthermore, the various elements of the detection system are initially operated. The ultrasonic sensor 101 detects the distance information between the obstacle and the robot 10. The γ-spectrum density meter 102 detects the soil density at the relevant position, and the high-definition camera 103 captures three-dimensional images in the loess hole. The information is transmitted to the control circuit board 505 by each of these elements through the wired communication, and then is processed by the control circuit board 505 to be transmitted to the ground data collecting center.

Further, after the three side tracks are exerted with the contact pressure, the control circuit board 13 sends an electrical signal to instruct the drive system to operate. Firstly, the driving motor 305 starts to rotate. This rotation is transmitted by the bevel gear 306, so that the spur gear 309 is provided with a predetermined speed and torque. The spur gear 308 is then engaged with the bevel gear 306 to drive a shaft on which the pulley 303 is located to obtain the power so as to drive the drive pulley 303 to rotate, which in turn drive the track to rotate. The robot is driven by the three side tracks to move in the loess hole.

Further, the spiral displacement sensor 703 starts to operate to measure deformation of a portion of the soil in contact with the odometer wheel 702. At the same time, the membrane pressure sensor 701 also starts to operate to record a pressure between the soil and the odometer wheel 702. The information is transmitted to the control circuit board 505 via the wired communication, and then transmitted to the data collecting center via the control circuit board 505, and the modulus information of the soil can be obtained through data analysis. At the same time, the odometer wheel 702 also starts to record a mileage of the robot 10 travelling in the loess hole.

Further, when the ultrasonic sensor 101 and the high-definition camera 103 are cooperated with each other so that a turning operation should be made, the control circuit board 505 will instruct the three side driving motors 305 to rotate at different speeds, so that the robot smoothly performs the turn through the differential speed between the three side tracks.

In particular, when the robot encounters defects such as bumps, voids, and collapse while travelling in the loess hole, since the robot employs the track travelling mechanism, such obstacles can be passed across by the self-adaptation of the rubber tracks. When there is a large obstacle or collapsible area in the front of the robot, the control circuit board 505 sends an electric signal to drive the tensioning motor 12 to reverse to be retracted by a cable.

The above disclosure is merely to illustrate the technical ideas of the present disclosure, and is not intended to limit the scope thereof. Any changes made to the technical solutions based on the technical ideas of the present disclosure shall fall within the scope defined by claims thereof.

What is claimed is:

1. An in-situ detection robot for loess geological information, comprising:
    a housing having a first housing member (1) and a second housing member (5) connected to the first housing member (1), each of the first housing member (1) and the second housing member (5) being provided with a track; and
    a tensioning system configured to provide the robot with a tensioning force in an aperture direction of a loess hole for the robot to travel in the loess hole, and comprising an active tensioning system,
    wherein the active tensioning system comprises:
        a tensioning motor (12), the tensioning motor (12) being located inside the housing, the tensioning motor (12) being connected to a driving camshaft (8), and the tensioning motor (12) being configured to provide a driving force for the active tensioning system;
        the driving camshaft (8), configured to support a driving cam group and transmit a driving force from the tensioning motor (12);
        the driving cam group, configured to transmit the driving force from the driving camshaft (8) to at least one driven cam group;
        the at least one driven cam group, configured to convert the driving force from the driving cam group into a tensioning force of the track in the aperture direction of the loess hole; and at least one connection base frame (2), configured to support the track and provides vibration damping and resetting.

2. The robot according to claim 1, wherein the tensioning motor (12) is fixed inside the second housing member (5), and is connected to the driving camshaft (8) via a coupler;
the driving camshaft (8) is supported, at two ends of the driving camshaft (8), by two connection bearings (11) that are fixed inside the first housing member (1) and the second housing member (5);
the driving cam group comprises six driving cams (6) which are axially positioned in a form of axial shoulder fixation and are circumferentially positioned by a key (9), such that each of the driving cams (6) is operated accurately;
the at least one connection base frame (2) comprises three connection base frames (2) spaced apart from each other by 120 degrees in a circumferential direction and supports the track in a form of a simple supporting beam;
each of the three connection base frames (2) comprises:
a first slider (203) fixed to the first housing member (1) by a sliding groove guide rail (13), wherein an elastic body (503) is disposed between an end surface of the first slider (203) and an upper end surface of a groove of the first housing member (1),
a second slider (201) connected in the same way as the first slider (203) to circumferentially fix a simple supporting structure, wherein the second slider (201) is configured to move in a groove where the first slider (203) or the second slider (201) is located, and the elastic body (503) provides vibration damping and resetting for the first slider (203) or the second slider (201); and
an intermediate connection shaft (202), configured to fix the first slider (203) or the second slider (201) to support the at least one driven cam group, wherein the at least one driven cam group comprises three driven cam groups, each group of the three driven can groups comprises two driven cams (4), and the three driven cam groups are spaced apart from each other by 120 degrees in a circumferential direction, and each group of the three driven cam groups is fixed to the intermediate connection shaft (202).

3. The robot according to claim 1, further comprising an auxiliary tensioning system configured to provide the robot with a pre-tensioning force for travelling in the loess hole and to measure a travelling distance of the robot in the loess hole at the same time.

4. The robot according to claim 3, wherein the auxiliary tensioning system comprises:
six elastic sleeves (704), wherein each of the first housing member (1) and the second housing member (5) comprises three elastic sleeves spaced apart from each other by 120 degrees in a circumferential direction to provide the robot with the pre-tensioning force for travelling in the loess holes;
a connection body, connected to the six elastic sleeves (704); and
an odometer wheel (702), fixed to the six elastic sleeves (704) by the connection body and configured to transmit the pre-tensioning force from the six elastic sleeves (704) and measure the travelling distance of robot in the loess hole.

5. The robot according to claim 1, further comprising:
a control system, configured to control a movement mode of the robot based on different travelling environments of the robot in loess holes; and
a drive system, configured to provide the robot with a power for travelling in the loess holes.

6. The robot according to claim 5, wherein the control system comprises a control circuit board (505) located on an inner wall of the second housing member (5), wherein the control circuit board (505) is configured to receive information outputted by a detection system, process the information outputted by the detection system, and transmit collected loess geological information to a ground data collecting center through a communication module mounted on the control circuit board (505), and
the control circuit board (505) is further configured to output an electric signal for controlling the motor based on obstacle information and pressure information to be received.

7. The robot according to claim 5, wherein the drive system comprises three single-side tracks (3) spaced apart from each other by 120 degrees in a circumferential direction, and each of the single-side tracks (3) comprises a driving motor (305), a bevel gear (306), a spur gear, a track side plate (301), a drive pulley (303), a driven pulley (307), an elastic track, and a plurality of drive system bearings (304);
the driving motor (305) is connected onto the track side plate (301) to provide the single-side track (3) with a driving force for travelling;
the bevel gear (306) is fixed onto an output shaft of the driving motor (305) and configured to transmit a power from the driving motor (305) to a transmission shaft, and then engaged with a spur gear I (308) on a shaft where the driving pulley (303) is located through a spur gear II (309) on the transmission shaft, such that the driving pulley (303) obtains a torque and a rotating speed to drive the single-side track (3) to rotate; and
the transmission shaft is supported by the plurality of drive system bearings (304) fixed by a bearing end cover (302) fixed onto the track side plate (301).

8. The robot according to claim 1, further comprising a detection system for detecting parameters associated with the loess geological information.

9. The robot according to claim 8, wherein the detection system comprises:
an optical moisture content detector (501), configured to detect moisture content of a soil at any specified position in the loess hole;
an ultrasonic sensor (101), configured to detect a distance between the robot and an obstacle in front of the robot in the loess hole;
a camera (103), configured to construct three-dimensional geological information in the loess hole and identify interface information of a loess and an ancient soil;
a γ-spectrum density measuring instrument (102), configured to detect a density of the soil at the specified position in the loess hole;
a pressure sensor (506), configured to monitor a pressure between the track and an inner wall of the loess hole;
a spiral displacement sensor (703), configured to record deformation of the soil at any moment when the robot travels in the loess hole;
a membrane pressure sensor (701), configured to record a pressure encountered by the soil at any moment; and
a data collecting center, configured to analyzes soil modulus information based on the parameters outputted by the optical moisture content detector (501), the ultrasonic sensor (101), the camera (103), the γ-spectrum density measuring instrument (102), the pressure sensor (506), the spiral displacement sensor (703), and the membrane pressure sensor (701).

* * * * *